Patented Feb. 24, 1953

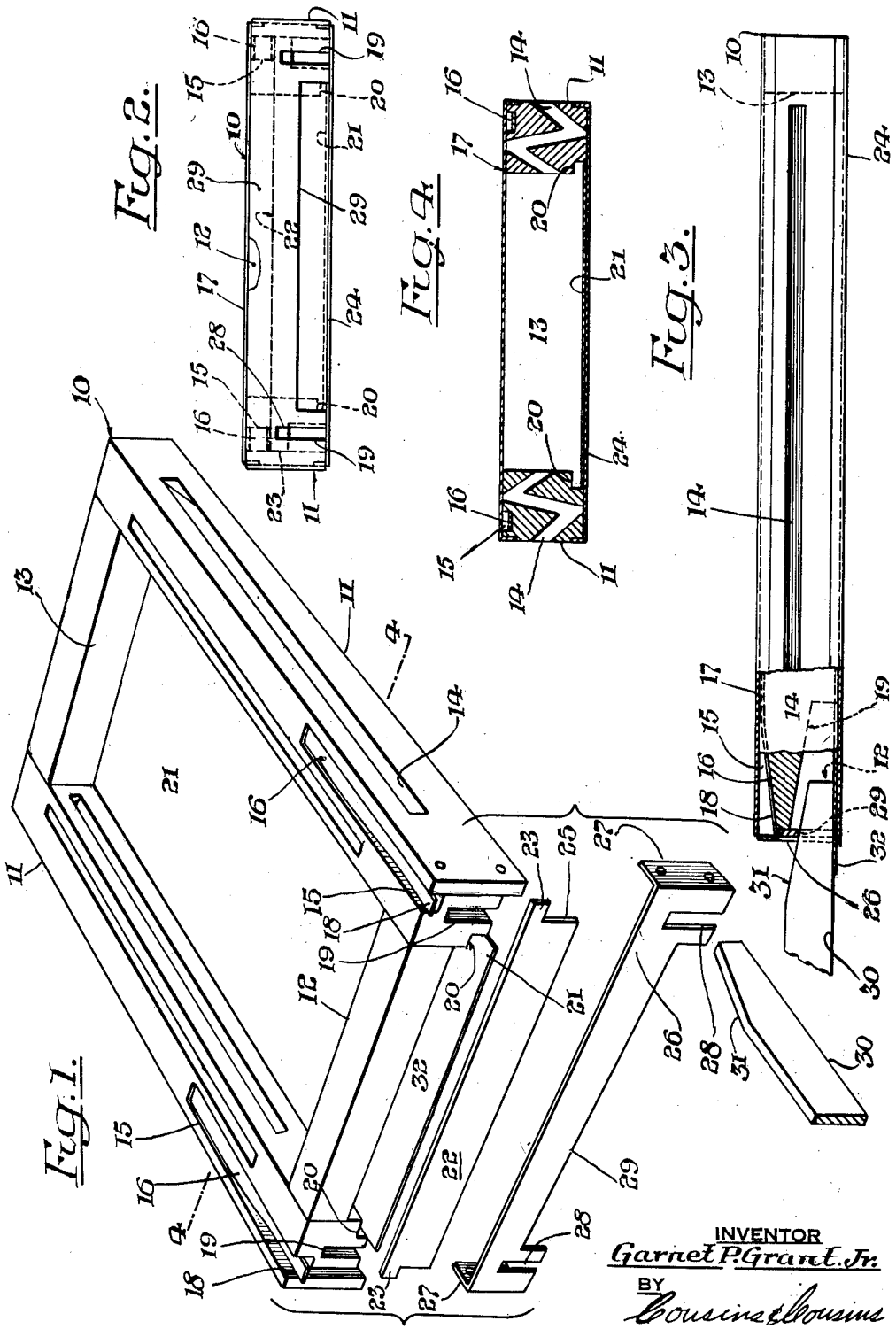

2,629,303

UNITED STATES PATENT OFFICE 2,629,303

FILM RECEIVING FRAME

Garnet P. Grant, Jr., Old Greenwich, Conn., assignor to Grant Photo Products, Inc., New York, N. Y., a corporation of Delaware Application January 31, 1951, Serial No. 208,817

5 Claims. (Cl. 95—67)

This invention relates to film holders, and specifically those which are used for receiving and carrying photographic film during the developing process. Where pictures are taken which are thereafter to be developed, in accordance with the disclosure set forth in U. S. Patent No. 2,337,989, dated December 28, 1943, in the name of Garnet P. Grant, Jr., it is necessary to remove the film from the camera and thereafter submit it to the various chemical processes necessary to produce the photographic impression. Presently known devices for accomplishing this purpose require that the film be moved from the camera into the various developing apparatus and chemicals in complete darkness. This means that either the developing machine must be adjacent the camera (a structure which requires a large amount of space), or that the camera must be unloaded in the dark room (a process which is impractical where large cameras are used).

Accordingly, it is an object of the present invention to provide a frame which may be used in conjunction with a photographic camera, whereby the film may be fed into the frame and thereafter removed in daylight, and processed in daylight while within the lightproof frame.

A further object of this invention is to facilitate the development of photographic film, particularly of the direct positive type, so as to enable the operator to present a finished picture to the customer.

Another object of the present invention is to provide a light, easily loaded and unloaded frame for handling photographic film.

A feature of the present invention is its lightproof structure, which permits the film and the chemicals therein without allowing light to enter.

Another feature of this invention is its movable gate construction which is adapted to be opened to receive the film, but will close to form a lightproof seal when the film is taken from the camera.

A further feature of this invention is its novel movable light trap construction.

The invention consists of the construction, combination and arrangement of parts, as herein illustrated, described and claimed.

In the accompany drawings, forming a part hereof, is illustrated one form of embodiment of the invention, in which drawings similar reference characters represent corresponding parts, and in which:

Figure 1 is an exploded view in perspective of the film processing frame with the top and bottom covers removed to show the interior construction thereof.

Figure 2 is a view in front elevation of a complete film developing frame, in accordance with the present invention.

Figure 3 is a side elevational view of a film developing frame, with certain portions cut away to show the structure thereof.

Figure 4 is a horizontal section taken on line 4—4 of Figure 1 of the film developing frame.

Referring to the drawings, 10 indicates a substantially rectangular structural member comprising parallel lateral members 11, separated by parallel front and rear support members 12 and 13. The lateral members 11 are provided with sinuous cuts 14 therein. These cuts 14, best shown in Figure 4, are so related one to the other as to provide a path leading from the outside of the structure 10 to the inside of the frame. It is to be noted that the nature of the cuts 14 are such that they can be produced by a straight cutting device such as a circular saw, and provide a lightproof opening without the necessity of using baffles or the like. The lateral support members 11 are provided on their upper surfaces with longitudinal grooves 15, which grooves run from the front of the said lateral members 11 rearwardly a suitable distance.

Flat spring members 16 are carried within the grooves 15 for a hereinafter described purpose. The spring members 16 are so constructed that when a top cover member 17 is secured to the top of the lateral members 11, as shown in Figures 2, 3 and 4, the springs 16 will be held in place with their projecting leaves 18 capable of upward motion.

The lateral members 11 are further provided with longitudinal slots 19 which run from the front thereof, rearwardly a suitable distance, and are cut into the lateral members 11 from the bottom thereof. Film receiving steps 20 cut into the lower inside edge of the lateral members 11 complete the construction of said lateral members 11. The steps 20 serve to receive and guide a film 21, as it is fed into the frame structure 10. A gate member 22, having projecting lateral ears 23 thereon, is carried upon the front of the film developing frame, and is of such size as to cover the openings in the front of the frame structure defined by the bottom cover 24, the two spaced lateral members 11 and the front support 12.

The sides 25 of the gate member 22 stop short of the slots 19, but the ears 23 of the said gate member 22 extend across the front of the slots 19. A plate member 26 having rearwardly depending flanges 27 thereon is carried upon the front of the frame and overlies the gate member 22. The plate 26 is provided with vertical openings 28 therein, which openings are in register with the slots 19 in the lateral members 11. The plate member 26 is also cut away along the lower edge thereof, as indicated at 29, so as to provide room for the passage of the film 21 into the developing frame.

When the developing frame is assembled, the ears 23 of the gate member 22 are lightly held down by the underside of the springs 16. At this point the frame member is entirely light sealed. When it is desired to use the camera (not shown) the developing frame is slipped into position, whereupon it is brought into contact with spaced cams 30 carried by the camera for this purpose. The cams 30 enter the openings 28 and the slots 19. The inclined faces 31 of each cam lifts the gate member 22 by forcing the ears upwardly against the tension of the springs 16. The film developing frame is now open and adapted to receive the film therein. However, inasmuch as the front of the frame is flush with the camera, no light can leak into the camera or developing frame.

After the picture is taken the film is fed out of the camera and into the frame, in the well known manner, and slides through the above described opening, being guided into place by the steps 20. When the entire portion of the exposed film has entered the developing frame, the film may be severed in any suitable manner from the remainder of the roll, and the frame withdrawn from engagement with the camera.

As the cams 30 are pulled from the slots 19, the springs 16 force the gate member 22 down until it completely covers the opening in the front of the developing frame. The entire developing frame, together with its exposed film therein, may then be carried about in the lighted room and developed in the presence of light, without injury to the said film. After the film has been removed from the camera a trailing edge 32 will remain projecting from the developing frame. This edge may be subsequently used to withdraw the film from the frame, after it has been developed, so that the frame may be reused without the necessity of disassembly after each use.

It will be seen that the above construction has provided a means for using roll film in a camera, and withdrawing portions of the film from the camera after they have been exposed for the purpose of developing, without the requirement of employing dark rooms.

Having thus fully described the invention, what is claimed as new and desired to be secured by Letters Patent of the United States, is:

1. A frame to receive and hold exposed photographic film comprising, a rectangular container having spaced lateral wall members therein and spaced front and rear support members between the said lateral members, a longitudinal groove in the top of each of the lateral members, said groove extending rearwardly from the front of the lateral members, a spring carried within each groove and projecting therefrom, a sinuous light-blocking, liquid-admitting opening carried in the wall of the container, a film receiving opening in the front of the said container and a knife-like gate member upon the frame overlaid by the projecting ends of the springs, and adapted to be moved up and down over the said front opening.

2. A frame to receive and hold exposed photographic film comprising, a rectangular container having spaced lateral wall members therein and spaced front and rear support members between the said lateral members, a longitudinal groove in the top of each of the lateral members, said groove extending rearwardly from the front of the lateral members, a spring carried within each groove and projecting therefrom, a vertical slot in the bottom of each of the lateral members, said slot extending rearwardly from the front of the lateral members and adapted to receive a cam therein, a sinuous light-blocking, liquid-admitting opening carried in the wall of the container, a film receiving opening in the front of the said container and a knife-like gate member upon the frame overlaid by the projecting ends of the springs, and adapted to be moved up and down over the said front opening.

3. A frame to receive and hold exposed photographic film comprising, a rectangular container having spaced lateral wall members therein and spaced front and rear support members between the said lateral members, a top cover member overlying the lateral and support members and a bottom cover member underlying the lateral and support members, a longitudinal groove in the top of each of the lateral members, said groove extending rearwardly from the front of the lateral members, a spring carried within each groove and projecting therefrom, a vertical slot in the bottom of each of the lateral members, said slot extending rearwardly from the front of the lateral member and adapted to receive a cam therein, a sinuous light-blocking and liquid-admitting opening carried in the wall of the container, a film receiving opening in the front of the said container and a knife-like gate member upon the frame having laterally disposed ears thereon said ears extending in front of the said slots so as to partially cover them, said gate being overlaid by the projecting ends of the springs, and adapted to be moved up and down over the said front opening.

4. A frame to receive and hold exposed photographic film comprising, a rectangular container having spaced lateral wall members therein and spaced front and rear support members between the said lateral members, a top cover member overlying the lateral and support members and a bottom cover member underlying the lateral and support members, a longitudinal groove in the top of each of the lateral members, said groove extending rearwardly from the front of the lateral members, a spring carried within each groove and projecting therefrom, a vertical slot in the bottom of each of the lateral members, said slot extending rearwardly from the front of the lateral member and adapted to receive a cam therein, a sinuous light-blocking, liquid-admitting opening carried in the wall of the container, a film receiving opening in the front of the said container and a knife-like gate member upon the frame having laterally disposed ears thereon extending in front of the said slots so as to partially cover them, said gate being overlaid by the projecting ends of the springs, and adapted to be moved up and down over the said front opening, and a plate covering the front of the frame and overlying the gate member, said plate having a film receiving opening therein for the purpose of loading and unloading the frame.

5. A frame to receive and hold exposed photographic film comprising, a rectangular container having spaced lateral wall members therein and spaced front and rear support members between the said lateral members, a top cover member overlying the lateral and support members and a bottom cover member underlying the lateral and support members, a longitudinal groove in the top of each of the lateral members, said groove extending rearwardly from the front of the lateral members, a spring carried within each groove and projecting therefrom, a vertical slot in the bottom of each of the lateral members, said slot extending rearwardly from the front of the lateral member and adapted to receive a cam therein, a sinuous light-blocking, liquid admitting opening carried in the wall of the container, a film receiving opening in the front of the said container and a knife-like gate member slidably carried upon the frame overlaid by the projecting ends of the springs, having laterally disposed ears thereon extending in front of the said slots so as to partially cover them, said gate being adapted to be moved up and down over the said front opening and a plate covering the front of the frame and overlying the gate member, said plate having a film receiving opening and a cam receiving opening therein for the purpose of loading and unloading the frame.

GARNET P. GRANT, Jr.

REFERENCES CITED

The following references are of record in the file of this patent:

FOREIGN PATENTS

| Number | Country | Date |
| --- | --- | --- |
| 8,405 | Great Britain | of 1910 |
| 166,555 | Great Britain | Nov. 20, 1922 |